US009685170B2

(12) United States Patent
Shechtman

(10) Patent No.: US 9,685,170 B2
(45) Date of Patent: Jun. 20, 2017

(54) PITCH MARKING IN SPEECH PROCESSING

(71) Applicant: International Business Machines Corporation, Armonk, NY (US)

(72) Inventor: Slava Shechtman, Haifa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/918,601

(22) Filed: Oct. 21, 2015

(65) Prior Publication Data

US 2017/0117001 A1 Apr. 27, 2017

(51) Int. Cl.

| | |
|---|---|
| ***G10L 21/00*** | (2013.01) |
| ***G10L 15/00*** | (2013.01) |
| ***G10L 25/00*** | (2013.01) |
| ***G10L 21/01*** | (2013.01) |
| ***G10L 25/09*** | (2013.01) |
| ***G10L 25/06*** | (2013.01) |
| ***G10L 25/90*** | (2013.01) |

(52) U.S. Cl.

CPC .............. *G10L 21/01* (2013.01); *G10L 25/06* (2013.01); *G10L 25/09* (2013.01); *G10L 25/90* (2013.01)

(58) Field of Classification Search

USPC ........ 704/207, 211, 214–218, 235, 246, 270, 704/275

See application file for complete search history.

(56) References Cited

U.S. PATENT DOCUMENTS

| | | | | | |
|---|---|---|---|---|---|
| 4,561,102 | A * | 12/1985 | Prezas | G10L 19/06 | 704/207 |
| 5,717,829 | A * | 2/1998 | Takagi | G10H 3/125 | 704/217 |
| 5,781,880 | A * | 7/1998 | Su | G10L 19/09 | 704/207 |
| 5,802,109 | A * | 9/1998 | Sano | G10L 19/012 | 375/245 |
| 5,809,455 | A * | 9/1998 | Nishiguchi | G10L 25/93 | 704/211 |

(Continued)

OTHER PUBLICATIONS

Kortekaas, R W. L& Kohlrausch, A. (1997). "Psychophysical Evaluation of PSOLA: Natural versus Synthetic Speech". In Proc. of Eurospeech, 5, pp. 2497-2490.

(Continued)

*Primary Examiner* — Edgar Guerra-Erazo

(57) ABSTRACT

According to some embodiments of the present invention, there is provided a computerized method for selecting and correcting pitch marks in speech processing and modification. The method comprises an action of receiving a continuous speech signal representing audible speech recorded by a microphone, where a sequence of pitch values and two or more pitch mark temporal values are computed from the continuous speech signal. The method comprises an action of computing for each of the pitch mark temporal values a lower limit temporal value and an upper limit temporal value by a cross-correlation function of the continuous speech signal around the pitch mark temporal values associated with pairs of elements in the sequence and replacing one or more of the pitch mark temporal values with one or more new temporal value between the lower limit temporal value and the upper limit temporal value.

20 Claims, 9 Drawing Sheets

(56) References Cited

U.S. PATENT DOCUMENTS

| | | | | |
|---|---|---|---|---|
| 6,954,726 | B2 * | 10/2005 | Brandel | G10L 25/90 704/207 |
| 7,155,386 | B2 * | 12/2006 | Gao | G10L 19/005 704/207 |
| 8,370,153 | B2 * | 2/2013 | Hirose | G10L 19/06 704/226 |
| 8,380,331 | B1 * | 2/2013 | Smaragdis | G10L 25/90 700/94 |
| 2004/0181397 | A1 * | 9/2004 | Gao | G10L 19/005 704/207 |
| 2005/0021325 | A1 * | 1/2005 | Seo | G10L 25/90 704/207 |
| 2009/0112580 | A1 * | 4/2009 | Hirabayashi | G10L 13/07 704/205 |
| 2010/0204990 | A1 * | 8/2010 | Hirose | G10L 19/06 704/243 |
| 2014/0195242 | A1 | 7/2014 | Chen | |

OTHER PUBLICATIONS

S. Lemmetty, “Review of Speech Synthesis Technology,” Master’s Thesis, Helsinki University of Technology, 1999.

Iias, F.; Munneì, N., “Reliable Pitch Marking of Affective Speech at Peaks or Valleys Using Restricted Dynamic Programming,” Multimedia, IEEE Transactions on , vol. 12, No. 6, pp. 481,489, Oct. 2010.

* cited by examiner

PITCH MARKING IN SPEECH PROCESSING

FIELD AND BACKGROUND OF THE INVENTION

The present invention, in some embodiments thereof, relates to speech processing and, more specifically, but not exclusively, to determining pitch marks for speech processing.

In speech processing, a continuous speech signal, for example recorded by a digital microphone, is analyzed to determine the parameters of the signal before further processing the signal, the speech, and the like. One of the basic parameters is the speech signal's pitch, which is the perceived audible frequency of the speech sound. The pitch comprises a frequency, such as the fundamental frequency of the speech signal, and pitch marks, which are associated with glottal closure instants (GCIs) produced by the vocal chords. As used herein, a pitch mark means a temporal value, such as a time value, and may be relative to a recent event, or an absolute temporal value. A pitch epoch is a window of the speech signal surrounding the GCIs and/or pitch marks. The pitch period may be parameterized in addition to or instead of the pitch frequency, where the pitch frequency is units of cycles per second, such as Hertz, and the pitch period is units of seconds, number of samples, and the like. For each pitch epoch, a speech signal section is produced and repeated at the pitch frequency, with possible overlap between each individual speech signal sections. The speech processing may rely on the speech signal, pitch, pitch marks, and/or the like, such as in Time Domain Pitch Synchronous Overlap and Add (TD-PSOLA) processing.

The quality of synthesized speech, such as text-to-speech (TTS), and/or recorded speech, undergoing prosody and/or other modifications via TD-PSOLA processing, depends on accurate determination of pitch marks. For example, to perform prosody modification with high audible quality for a TTS signal, the consistency of pitch marks should be maintained both between adjacent epochs and over a large number of epochs, such as in avoiding pitch drift, pitch lag, and the like. Reference is now made to FIG. 1, which is a schematic diagram of TD-PSOLA pitch modification of a voiced speech segment. For example, a continuous speech signal 121 is processed to determine pitch values, pitch mark temporal values 120C, such as along a time axis 124, and pitch epochs 120B. By modifying the speech signal 121 of each pitch epoch 120B to decrease the pitch period, such as decrease the time between the pitch marks 120C, produces an increase in the pitch of the speech signal 122 and the speech may be heard as having a higher frequency. By modifying the speech signal 121 of each pitch epoch 120B to increase the pitch period, such as increase the time between the pitch marks 120C, produces a decrease in the pitch of the speech signal 123 and the speech may be heard as having lower frequency. As used herein, the term local pitch consistency means the pitch consistency between temporally adjacent pitch epochs. As used herein, the term global pitch consistency means the pitch consistence across a large number of pitch epochs.

The importance of pitch marking in speech processing has resulted in many pitch marking methods being developed. For example, Dikshit et al describe several of these algorithms in the work titled "An Algorithm for Locating Fundamental Frequency Markers in Speech Signals" published in the Proceedings of Acoustics, Speech, and Signal Processing, 2005 (ICASSP '05) pages 233 to 236, incorporated herein by reference in its entirety. For example, other algorithms are described by Höge et al in "Evaluation of Pitch Marking Algorithms" published in the Proceedings of the ITG, Kiel, Germany, 2006, incorporated herein by reference in its entirety.

SUMMARY OF THE INVENTION

According to some embodiments of the present invention, there is provided a computerized method for selecting and correcting pitch marks in speech processing and modification. The method comprises an action of receiving a continuous speech signal representing audible speech recorded by a microphone, where a sequence of pitch values and two or more pitch mark temporal values are computed from the continuous speech signal, each of the pitch mark temporal values associated with one element of the sequence. The method comprises an action of computing, by one or more hardware processors, for each of the pitch mark temporal values a lower limit temporal value and an upper limit temporal value by a cross-correlation function of the continuous speech signal around the pitch mark temporal values associated with pairs of elements in the sequence. The method comprises an action of replacing one or more of the pitch mark temporal values with one or more new temporal value between the lower limit temporal value and the upper limit temporal value. The method comprises an action of outputting one or more combination of the pitch mark temporal values to a speech processor for one or more of speech processing, modification, and conversion to an audible output sound signal, where elements of the combination are between the lower limit temporal value and the upper limit temporal value.

Optionally, the cross-correlation is a normalized linear cross-correlation function.

Optionally, the continuous speech signal is preprocessed by a zero-phase, low-pass filter to reduce its high-band noise components prior to the computing of the cross-correlation function.

Optionally, the cross-correlation function is computed using a formula $$r(\Delta) = \frac{x(\Delta)^T y(0)}{0.5(\|x(\Delta)\|^2 + \|y(0)\|^2)},$$

where Δ denotes a temporal offset value from one of the pitch mark temporal values, x(Δ) denotes an input section of the continuous speech signal shifted by Δ samples relative to a first pitch mark temporal value and y(0) denotes an unshifted input section of the continuous speech signal associated with a second pitch mark temporal value.

Optionally, the lower limit temporal value and the upper limit temporal value are determined by two or more input values of the cross-correlation function, associated with respective output values of the cross-correlation function that are a predefined ratio of a peak output value of the cross-correlation function.

Optionally, the predefined ratio is 0.97 of the peak output value.

Optionally, the predefined ratio is a value between 0.8 and 0.999 of the peak output value.

Optionally, the first input section of the continuous speech signal is temporally preceding the second input section of the continuous speech signal.

Optionally, the second input section of the continuous speech signal is temporally preceding the first input section of the continuous speech signal.

Optionally, the method further comprises an action of selecting a preferred pitch mark sequence from the combination, where the preferred pitch mark sequence is selected by minimization of a sequence global consistency criterion, where the sequence global consistency criterion is a sum of individual global consistency criteria of each the element in the combination.

Optionally, each individual global consistency criteria is derived from a temporal drift of each the element, relative to a certain reference pitch mark.

Optionally, the continuous speech signal is preprocessed by a zero-phase, low-pass filter to reduce its high-band noise components prior to the computing of the pitch mark drift function.

Optionally, the continuous speech signal is digitized by the hardware processor(s).

Optionally, the sequence of pitch values are computed from the continuous speech signal by the hardware processor(s).

Optionally, the pitch mark temporal values are computed from the continuous speech signal by the hardware processor(s).

Optionally, the sequence of pitch values are non-zero pitch mark values.

According to some embodiments of the present invention, there is provided a computer program product for selecting and correcting pitch marks in speech processing and modification. The computer program product comprising a computer readable storage medium having program instructions embodied therewith. The program instructions executable by a hardware processor cause the hardware processor to receive a continuous speech signal representing audible speech recorded by a microphone, where a sequence of pitch values and two or more pitch mark temporal values are computed from the continuous speech signal, each of the pitch mark temporal values associated with one element of the sequence The program instructions executable by a hardware processor cause the hardware processor to compute for each of the pitch mark temporal values a lower limit temporal value and an upper limit temporal value by a cross-correlation function of the continuous speech signal around the pitch mark temporal values associated with pairs of elements in the sequence The program instructions executable by a hardware processor cause the hardware processor to replace one or more of the pitch mark temporal values with one or more new temporal value between the lower limit temporal value and the upper limit temporal value The program instructions executable by a hardware processor cause the hardware processor to output one or more combination of the pitch mark temporal values to a speech processor for one or more of speech processing, modification, and conversion to an audible output sound signal, where elements of the combination are between the lower limit temporal value and the upper limit temporal value to prevent pitch mark drift.

According to some embodiments of the present invention, there is provided a system for selecting and correcting pitch marks in speech processing and modification. The system comprises an input interface, for receiving a continuous speech signal and two or more speech parameters from a speech processor. The system comprises one or more hardware processors adapted to receive, by the hardware processor(s), a continuous speech signal representing audible speech recorded by a microphone, where a sequence of pitch values and two or more pitch mark temporal values are computed from the continuous speech signal, each of the pitch mark temporal values associated with one element of the sequence. The hardware processor(s) are adapted to compute for each of the pitch mark temporal values a lower limit temporal value and an upper limit temporal value by a cross-correlation function of the continuous speech signal around the pitch mark temporal values associated with pairs of elements in the sequence. The hardware processor(s) are adapted to replace one or more of the pitch mark temporal values with one or more new temporal value between the lower limit temporal value and the upper limit temporal value. The hardware processor(s) are adapted to output one or more combination of the pitch mark temporal values, where elements of the combination are between the lower limit temporal value and the upper limit temporal value to prevent pitch mark drift. The system comprises an output interface, for sending the combination to a speech processor for one or more of a speech processing, a modification, and a conversion to an audible output sound signal.

Optionally, the speech processor is incorporated into the hardware processor(s).

Optionally, the input interface and the output interface are one or more of a network interface and a user interface.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
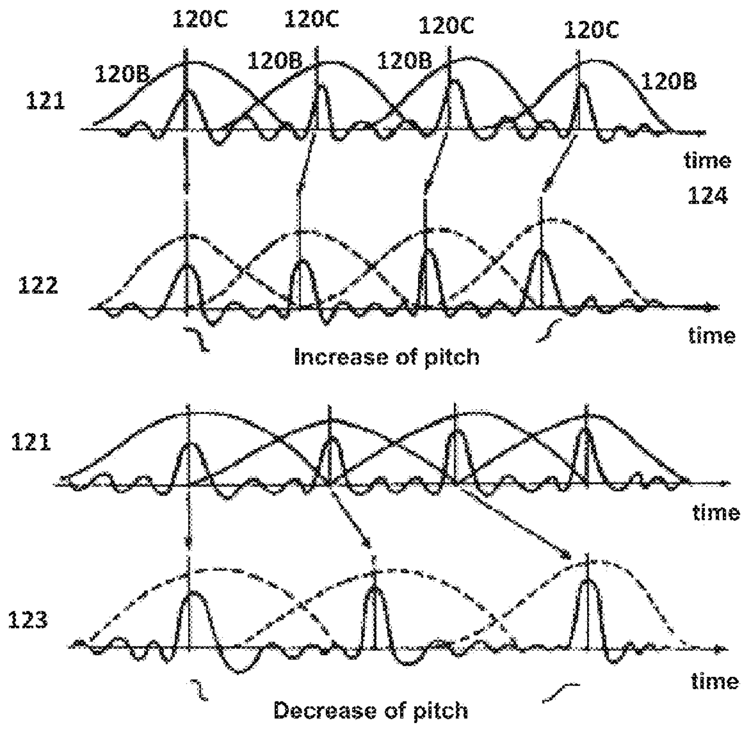
FIG. 1 is a schematic diagram of TD-PSOLA pitch modification of a voiced speech segment.

The present invention, in some embodiments thereof, relates to speech processing and, more specifically, but not exclusively, to determining pitch marks for speech processing.

Many methods have been developed for selecting pitch marks. Methods to pick pitch marks typically do not work for all types of speech signals.

A local pitch consistency and a global pitch consistency are defined herein as an outcome of matching adjacent epoch pitch marks and an outcome of matching pitch marks over non-adjacent epochs, respectively. The global consistency of pitch marks is a property of the pitch marks in relation to prominent portions of the pitch epochs over the continuous speech signal. The local consistency of pitch marks is a property of phase coherency preservation of pitch marks in consecutive pitch epochs, and allows preserving high quality Time Domain Pitch Synchronous Overlap and Add (TD-PSOLA) output both for recorded and synthesized speech. For example, in text-to-speech (TTS) applications, pitch marks without global pitch consistency may result in audible distortions, such as a roughness phenomenon at non-contiguous TTS segment boundaries. For example, many pitch marking methods use pitch trajectory to improve the local pitch consistency and improve the global pitch consistency by confining the search of pitch marks to be among certain prominent speech signal anchors, such as speech signal extremes, short-time energy peaks, glottal closure instants (GCIs), and the like. For example, correlation based pitch mark detection is used in the Praat software package (Praat) published at www(dot)praat(dot)org, which preserves local pitch consistency, but not global pitch consistency. Peak picking-based mark detection is used in Praat to preserve global pitch consistency; however, this detection process fails to preserve local pitch consistency of pitch marks and there are no existing methods to combine them with a correlation method. Current cross-correlation and/or auto-correlation methods of speech signals for local pitch consistency do not take into account the fact that a cross-correlation of continuous speech signal portions between pitch epochs is different when correlating forward in time from when correlating backward in time. For example, a first pitch epoch with a subsequent pitch epoch is correlated from when correlated a subsequent pitch epoch with a first pitch epoch, and thus may result in pitch mark drift dependent on the correlation direction.

Current processes that combine optimization of both local and global pitch consistency use a cost function that selects a sequence of pitch marks, one pitch mark for each pitch epoch, while simultaneously optimizing local and global pitch consistency. These processes are dependent on the cost function used and the relative weighting between local and global pitch consistence in the function. Thus, current pitch consistency cost functions are tuned to perform well for certain types of speech signals, and none covers wide ranges of speech signal types, such as speech signal modalities. For example, previous methods for picking pitch marks may fail when only rough pitch trajectory is available from the continuous speech signal for local pitch consistency. For example, those methods do not guarantee local pitch consistency in complex cases, such as glottal sounds, creaky voice, abrupt pitch changes, and the like, where current pitch detector algorithms may not reliably detect the prominent speech signal parameters. Thus, none of the current pitch marking methods automatically ensures both local and global pitch consistency without manual user input in pitch mark correction.

According to some embodiments of the present invention, there are provided methods and systems to improve audible quality of a processed speech signal, such as improving local and global pitch consistency, pitch mark drift, and the like, by automatically determining one or more combinations of pitch marks that include pitch marks determined by a cross-correlation function. A continuous digital speech signal is received, such as a signal recorded with a digital microphone, a signal produced by a text to speech processor, and the like, and a speech processor analyzes the signal to determine a sequence of pitch epochs, each pitch epoch associated with a pitch value and one or more pitch marks. Cross-correlation functions between the continuous speech signal portions of adjacent pitch epoch pairs in the sequence surrounding their corresponding pitch marks are evaluated. For each pitch mark in each pitch epoch, we determine when it is within the predefined temporal limits when sequenced with pitch marks of adjacent pitch epochs, such as temporal limits determined from corresponding correlation output values within a predefined tolerance of corresponding cross-correlation function output values. When all pitch marks are beyond the temporal limits when sequenced with certain pitch marks of adjacent pitch epochs, new pitch marks are determined by the output values of the corresponding cross-correlation functions between the continuous speech portions of corresponding adjacent pitch epoch in the sequence. One or more combinations of pitch marks, where one pitch mark is selected for each pitch epoch, and the pitch marks are within the temporal limits related to their adjacent pitch marks are determined. Those combinations have improved local pitch consistency by including the new pitch marks in the combinations.

One or more of the pitch mark combinations may be sent to a speech processor for modification, conversion to an output speech signal, conversion to audible output, stored for future use and/or the like. For example, one or more of the pitch mark combinations is sent to a speech processor comprising a Time Domain Pitch Synchronous Overlap and Add (TD-PSOLA) processing module. The TD-PSOLA module changes the speech signal using a pitch mark combination, and the modified speech signal is converted to an audible signal output by the speech processor.

Optionally, a global consistency criterion is used to select one of the pitch mark combinations as a preferred pitch mark combination. For example, an output value of a pitch mark consistency function is used to select an improved and/or preferred pitch mark combination.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
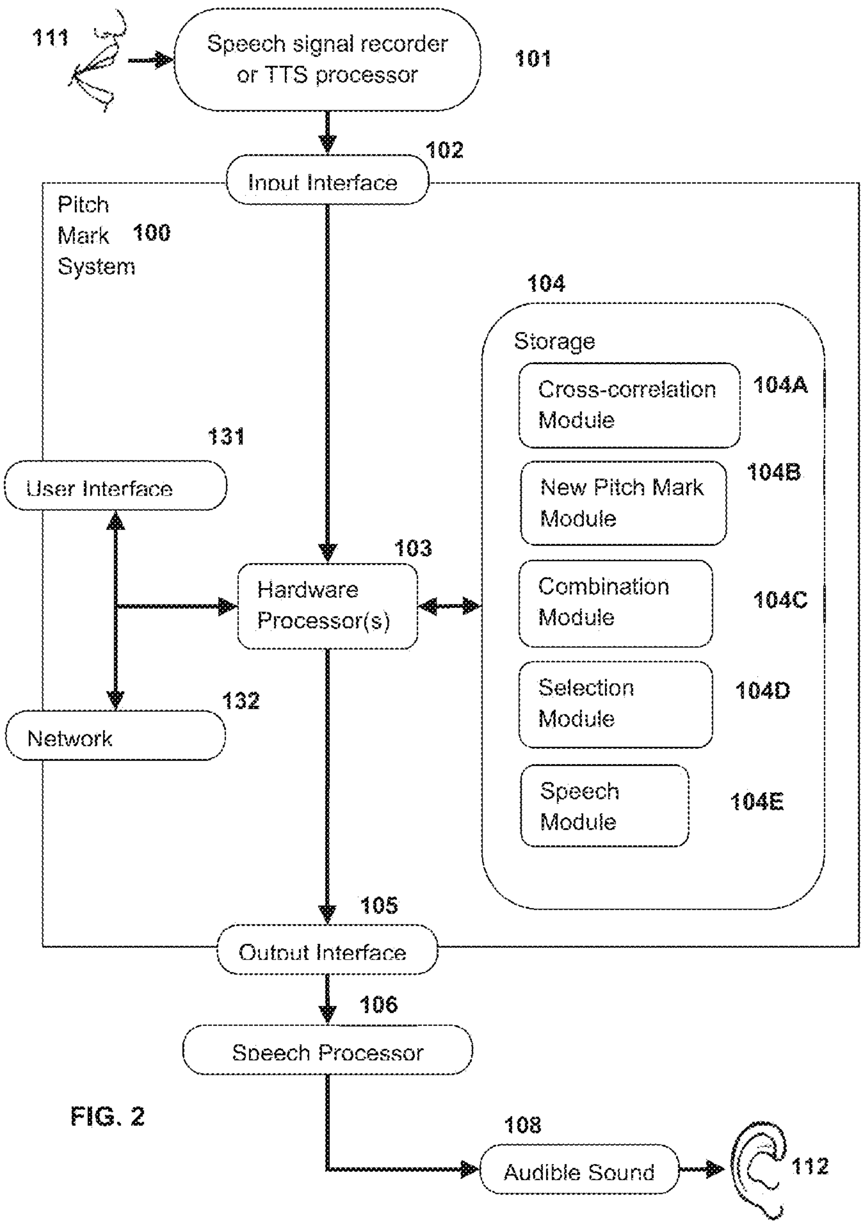
FIG. 2 is a schematic diagram of a system for pitch mark replacement and selection, according to some embodiments of the invention.

Reference is now made to FIG. 2, which is a schematic diagram of a system for pitch mark selection and correction, according to some embodiments of the invention. The pitch mark system 100 comprises an input interface 102 for receiving a continuous speech signal in a digital format, such as a .wav format, a .mp3 format, and the like, representing a speech signal 111 recorded and/or converted by a signal recorder, a speech processor, a microphone, and/or the like 101. For example, the speech processor 101 generates a speech signal and/or pitch parameters for processing by the pitch mark system 100. When the continuous speech signal is received by the system 100, one or more hardware processors 103 retrieve software modules (104A, 104B, 104C, 104D, and 104E) for processing the speech signal and/or speech parameters.

For example, the modules are stored on a digital storage 104 device incorporated into the system 100. Each software module comprises processor instructions that when executed on the hardware processor(s) 103 configure the hardware processor(s) to perform one or more actions of an embodiment of the invention.

The Cross-Correlation Module 104A comprises processor instructions to automatically receive the continuous speech signal and speech signal parameters, such as pitch epochs, pitch values for each pitch epoch, one or more pitch marks for each pitch epoch, and the like, and automatically calculate output values of a cross-correlation function between continuous speech signal portions of adjacent pitch epochs, surrounding their pitch marks. The new pitch mark module 104B comprises processor instructions to automatically determine a new pitch mark for a given pitch epoch within given upper and lower temporal limits. For example, the new pitch mark module 104B comprises processor instructions, which select a new pitch mark temporal value from a peak correlation output value of the corresponding cross-correlation function. For example, the new pitch mark module 104B comprises processor instructions to automatically select a new pitch mark temporal value within given upper and lower limits, where it is near another pitch mark of the corresponding pitch epoch.

The combination module 104C comprises processor instructions to automatically select one or more pitch mark combinations that are locally consistent, so that there is a single pitch mark per pitch epoch in a combination, such as in a sequence of pitch marks. For each pitch mark in each combination the new pitch mark module 104B comprises processor instructions to automatically determine a lower and an upper pitch mark temporal limit according to a predefined correlation tolerance value. For example, temporal values preceding and following the corresponding cross-correlation function's argmax output value, such as a peak value, using a predefined tolerance value, such as a 0.95 or 95% value. When certain pitch marks are outside the range of tolerance temporal limits, the combination module may select new pitch mark temporal values within the correlation tolerance limits and select this value for this pitch epoch and in this specific combination. The selection of new pitch marks may continue iteratively, until no pitch marks are left or any other stop condition is met.

Optionally, the combination module 104C comprises processor instructions to automatically select one or more initial pitch mark combinations. Subsequently, the processor instructions instruct a hardware processor to generate one or more locally consistent pitch mark combinations by combining pitch mark analysis in a temporally forward and temporally backward direction. For example, the new pitch mark module 104B comprises processor instructions to compute temporally forward correlation pitch mark limits for a first unprocessed epoch to the temporally following of a certain pitch epoch, until a first unvoiced and/or partially voiced pitch epoch is encountered by moving from pitch epoch to pitch epoch forward in time. For example, the new pitch mark module 104B comprises processor instructions to automatically compute temporally backward correlation pitch marks in a similar manner. When original pitch marks are outside the pitch marks limits the pitch mark is replaced with a new pitch mark within the limits by the processor instructions of the new pitch mark module 104B.

The selection module 104C comprises processor instructions to automatically select a preferred combination for further processing, such as by a TD-PSOLA speech processor 106, a speech processing module 104E, and the like.

The combinations and/or a preferred combination may be sent through an output interface 105 to a speech processor 106 for conversion to an audible output sound 108 for hearing by an end user 112. Optionally, the input 102 and/or output 105 interfaces are a network interface 132, a user interface 131, and the like. The network interface 132 and/or user interface 131 may be used by a user for the user to monitor the system operation, system performance, modify processing parameters, and the like. For example, the system 100 may be incorporated into a miniaturized device that has a user interface 131 comprising an on and off button and a light emitting diode. For example, the network interface is used to access a web browser server that allows configuration of the system.

Figure 3A:
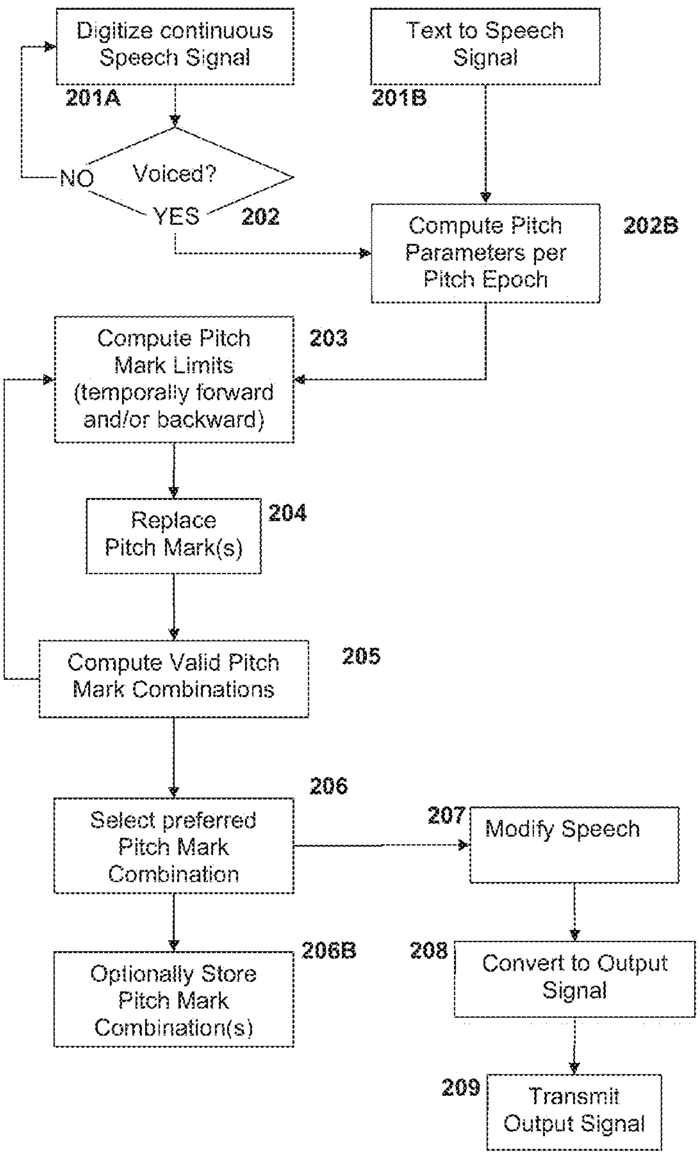
FIG. 3A is a flowchart of a method for pitch mark replacement and selection, according to some embodiments of the invention.

Reference is now made to FIG. 3A, which is a flowchart of a method for pitch mark replacement and selection, according to some embodiments of the invention. A pitch mark system 100 receives a digitized continuous speech signal 201A, text-to-speech signal 201B, and the like. The digitized continuous speech signal is processed by hardware processor(s) 103 to determine 202 whether it represents a voiced speech signal for further processing. The hardware processor(s) 103 computes 202B pitch parameters from the continuous speech signal, such as a sequence of pitch epochs, a pitch value per epoch, pitch marks per epoch, and the like. Optionally, an external speech processor 101 computes the speech parameters and the speech parameters are received by the pitch mark system 100. The hardware processor(s) 103 computes 203 pitch mark limits based on an cross-correlation function between each pair of adjacent epochs, such as one or more times in the forward temporal direction and/or one or more times in the reverse temporal direction.

Now are described details of an embodiment of cross-correlation computation. Given a pair of consecutive voiced epoch pitch marks, denoted $n_{i-1}$ and $n_i$, and their corresponding integer pitch period values denoted, $p_{i-1}$ and $p_i$, the optimal shift for one mark, when the other is fixed, is determined so that the pitch mark pair becomes coherent. x(n) denotes a continuous speech signal portion after applying a zero-phase low-pass filter to reduce the high band noise components, such as noise components above 4 kilohertz. A symmetric truncation and zero padding operator is defined as:

$$[x(n)]_N^K = \begin{cases} x(n), & |n| \le N \\ 0, & N < |n| \le K \end{cases}$$

The symbol $x_i(\Delta)$ denotes the truncated waveform centered over $n_i-\Delta$ and $y_{i-1}(0)$ denotes the fixed pitch period-long waveform centered over $n_i-1$:

$$\begin{cases} x_i(\Delta) = [x(n-n_i-\Delta)]_{\left[\frac{p_{i-1}}{2}\right]}^{\left\lfloor\frac{max(p_i,p_{i-1})}{2}\right\rfloor} \\ y_{i-1}(0) = [x(n-n_{i-1})]_{\left[\frac{p_{i-1}}{2}\right]}^{\left\lfloor\frac{max(p_i,p_{i-1})}{2}\right\rfloor} \end{cases}$$

The cross-correlation function computed to obtain the local pitch mark consistency is defined by:

$$r_i(\Delta) = \frac{x_i(\Delta)^T y_{i-1}(0)}{0.5(\|x_i(\Delta)\|^2 + \|y_{i-1}(0)\|^2)}$$

where the maximization of $r_i(\Delta)$ is equivalent to minimization of $\|x_i(\Delta)-y_{i-1}(0)\|^2$ For example, $\Delta^*=\text{argmax}(r_i(\Delta))$ finds the adjacent pitch epoch optimal pitch mark location and corresponds to the peak of the cross-correlation function.

The output value of the cross-correlation function, $r_i(\Delta)$, obtains its largest value when $\Delta^*=n_i-n_{i-1}$, but this should be definitely well beyond the search scope. For example, the cross-correlation output value is set to zero when $\Delta^*=n_i-n_{i-1}$.

Similarly, one may define a reverse cross-correlation by keeping the i-th pitch epoch unmodified, while cross-correlating the (i−1) pitch epoch:

$$\tilde{r}_i(\Delta) = \frac{x_i(0)^T y_{i-1}(-\Delta)}{0.5(\|x_i(0)\|^2 + \|y_{i-1}(-\Delta)\|^2)}$$

For an ideal periodical signal, $r_i(\Delta)=\tilde{r}_i(\Delta)$, but this is not the case for real continuous speech signals. Forward and backward optimal shifts ($\Delta^*$, $\tilde{\Delta}^*$) may be significantly different as described hereinbelow.

To determine when a certain pitch mark associated with a certain pitch epoch is locally consistent with another pitch mark, associated with an adjacent pitch epoch, we determine an interval of allowed pitch mark shifts, whose left and right limits are denoted Δ* left and Δ* right respectively, and the pitch mark shifts are computed using the corresponding cross-correlation function and a predefined correlation tolerance value α:

$$r_i(\Delta\epsilon[\Delta^*_{left},\Delta^*_{right}])\ge\alpha r_i(\Delta^*)$$

When the left shift limit is non-positive and the right is non-negative, such as the pitch mark is within this pitch mark interval, it is considered locally consistent to the pitch mark of the adjacent pitch mark epoch.

The intervals may differ for the forward and for the backward cross-correlation. For example, the allowed interval to be locally consistent the next epoch pitch mark is calculated using backward cross-correlation. For example, the allowed interval to be locally consistent to the previous epoch pitch mark is calculated using forward cross-correlation. Valid pitch mark combinations have adjacent voiced pitch epoch pairs that are locally consistent.

For example, the value of α equals 0.95, 0.97, is between 0.8 and 0.999, and the like. For example, lower tolerance value α may be used for poorly correlated voiced or partially voiced pitch epochs. For example, a typical tolerance value of a equal to 0.97 may prevent pitch mark drift, while not introducing audible degradation from sub-optimal local mark placement. Thus, as shown in FIG. 3A, computed and/or received Pitch marks outside of the pitch mark limits are replaced 204, for example, by the corresponding cross-correlation argmax.

The hardware processor(s) 103 computes 205 valid combinations from the resulting pitch marks from action 204, and optionally selects 206 a preferred pitch mark combination.

Optionally, valid combinations are used to compute 205 new pitch limits 203 and the process of replacing 204 pitch marks, computing 205 new combinations and computing 203 new pitch limits is repeated iteratively.

Optionally, no valid combinations are computed after certain pitch mark replacement 204, and more iterations of new pitch limits computation 203 and pitch marks replacement 204 are applied, so that valid combinations may be computed 205. For example, when the tolerance is set at a small value, such as 0.99, no valid combinations are found, and in the next iteration, the tolerance is set to a slightly large value, such as 0.97 to repeat the limit computing 203, replacing 204, and combination computing 205. For example, the tolerance is increased iteratively until valid combinations are found.

Optionally, valid partial combinations are computed and combined together.

Optionally, the valid pitch mark combinations and/or one or more preferred pitch marks are stored 206B for sending to speech processor and/or later use. For example, in TTS when pitch marks are evaluated before hand and stored together with a speech signal and/or text for later processing.

Following is a detailed embodiment of selecting a preferred pitch mark combination when more than one locally consistent combination is produced. For example, although using the cross-correlation function output values may insure local consistency while preserving global pitch consistency to some extent, it occasionally may not fully correct the pitch mark drift, especially at non-stationary voiced transitions, where adjacent pitch epoch signals are poorly correlated. We define a pitch mark combination global consistency criterion to be equal to a sum of individual global consistency criteria, evaluated for each pitch epoch in the combination. For example, a mark centralization criterion may be utilized to define the individual global pitch mark consistency criterion.

Let Δ denote a temporal distance between the current pitch mark associated with a certain pitch epoch and some reference pitch mark of the same pitch epoch. Then the individual global consistency criterion may be defined as $d(\Delta)=\lfloor|\Delta|/pq\rfloor$, where p denotes the corresponding pitch period and q denotes a quantization step. For example, when q=0.05, d(Δ) obtains integers from 0 to 10, where a lower value is the better. In some embodiments, the reference pitch mark may be the nearest pitch mark, computed at 202B. For example, only new complementary marks have non-zero global consistency criterion. In some embodiments, the reference pitch mark may be the most prominent pitch mark, computed at 202B, where the prominence is defined for example, by maximal absolute value, maximal local energy, and/or the like. In some embodiments, the selected reference pitch mark may be determined by peak analysis of a zero phase low pass filtered pitch period signal.

The pitch mark combinations and/or preferred pitch mark combination are sent by the pitch mark system 100 to a speech processor 106 for speech modification 207, processing and/or conversion 208 to an output signal. Optionally, the output signal is transmitted 209 as an audible signal for hearing by a human.

Figure 3B:
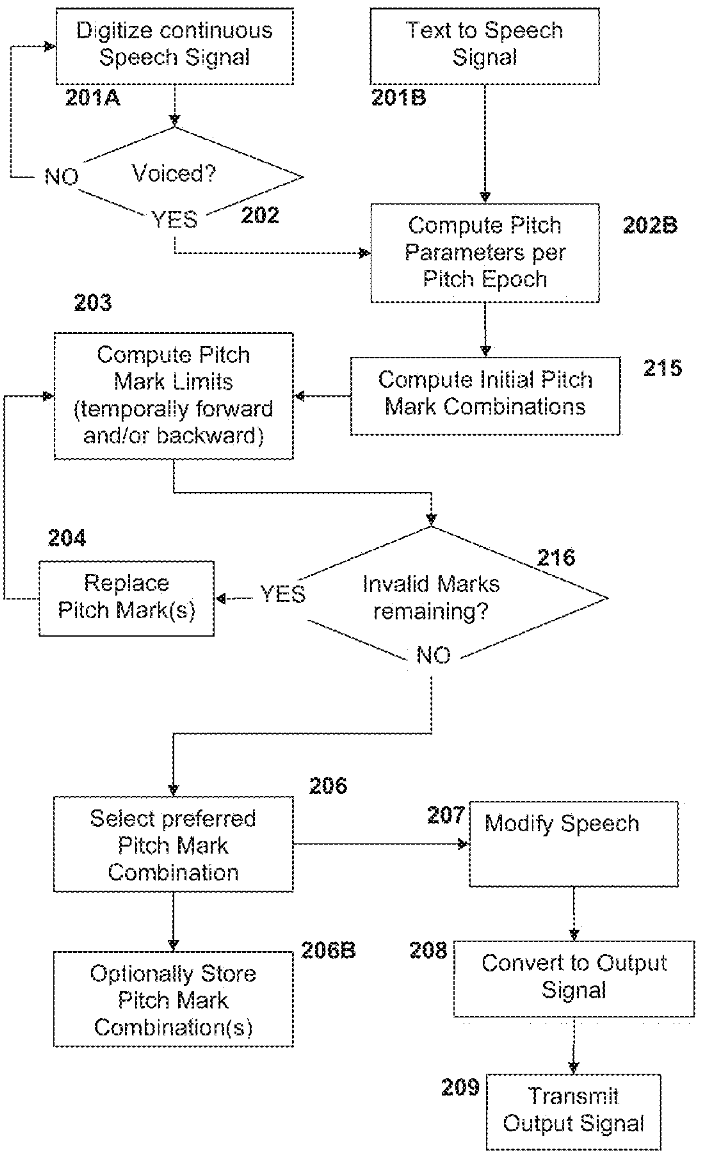
FIG. 3B is a flowchart of a second method for pitch mark replacement and selection, according to some embodiments of the invention.

It is recognized that the steps depicted in FIG. 3A may be performed in a different order according to different embodiments of the invention, as described herein. Reference is now made to FIG. 3B, which is a flowchart of a second method for pitch mark replacement and selection, according to some embodiments of the invention. The difference in this alternative embodiment from the method described in FIG. 3A is described herein. For example, the hardware processor(s) 103 computes 215 one or more initial pitch mark combination such that a single pitch mark is selected per pitch epoch, selects an optionally arbitrary starting pitch epoch and mark it as processed. For each initial combination, the hardware processor(s) 103 may compute 203 pitch mark limits based on a backward and/or forward cross-correlation function between each pair of an unprocessed epoch and its adjacent processed epoch, surrounding the corresponding pitch marks. When invalid pitch marks, such as pitch marks that are previous in time to a minimum pitch mark limit or subsequent in time from a maximum pitch mark limit, are found 216 the invalid pitch marks may be replaced 204 by a new pitch mark within the valid temporal limits. The analyzed epochs are marked as processed. For example, pitch mark limits are derived from the forward cross-correlation for epochs that come after the starting epoch and derived from the reverse cross-correlation for epochs that come before the starting epoch. For example, the stop condition is when no unprocessed voiced epochs are left, adjacent to the processed epochs, such as non-voiced and/or partially voiced speech frames are detected adjacent to the processed epochs. An embodiment of an algorithm for such a process follows:

Construct one or more initial mark combinations.

For each initial combination, construct one or more locally consistent combinations in the following, optionally iterative, manner:

Start: determine certain pitch epochs to be fixed and its pitch marks kept unchanged, at least one per continuous voiced speech portion.

1: Evaluate forward correlation pitch mark limits for a first unprocessed epoch to the right of the fixed epoch, until first unvoiced, or very poorly correlated voiced, epoch is encountered, such as moving from left to right.

2: Evaluate backward correlation pitch mark limits for a first unprocessed epoch to the left of the fixed epoch, until first unvoiced, or very poorly correlated voiced, epoch is encountered, such as moving from right to left.

3: When nothing is left to process, GOTO END

4: When either pitch marks being processed is invalid, such as beyond the limits, substitute the invalid mark(s) by computing a new pitch mark(s).

5: GOTO 1

END. .

Optionally, the method described by FIG. 3B is executed several times for each available combination, such as with different starting pitch epochs, pitch mark limits, tolerance values, cross-correlation functions, and the like, to compute more than one locally consistent combination from each initial combination.

Figure 3C:
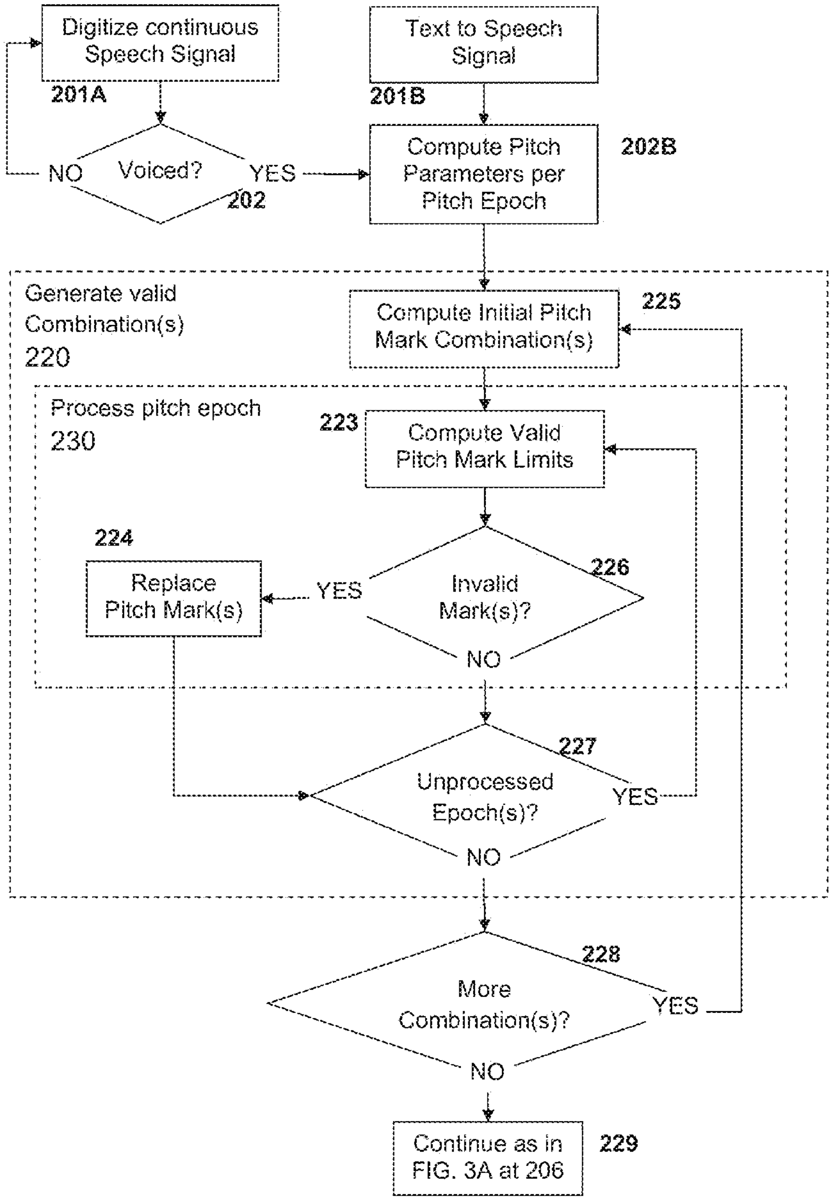
FIG. 3C is a flowchart of a third method for pitch mark replacement and selection, according to some embodiments of the invention.

Reference is now made to FIG. 3C, which is a flowchart of a third method for pitch mark replacement and selection, according to some embodiments of the invention. As in FIG. 3A, the third method digitizes 201A a continuous speech signal thru computing 202B pitch parameters per pitch epoch. The third method includes two sub-methods: a sub-method to generate 220 valid combinations and a sub-method to process 230 unprocessed pitch epochs. The computed 202B pitch parameters are used to compute 225 one or more initial pitch mark combinations and to determine a starting pitch epoch, labeled as processed. All the other epochs in the initial combination are labeled as unprocessed. A sub-method 230 processes the unprocessed pitch epochs, adjacent to the processed ones. Specifically, valid pitch mark limits are computed 223 for each epoch, being processed 230, and when invalid pitch marks exist 226 in the epochs being processed, they are replaced 224 with new pitch marks, such as the pitch mark upper or lower limits, cross-correlation argmax and the like. After the processing 230, the epochs are labeled as processed. The processing of unprocessed epochs continues until no more unprocessed epochs remain. When additional possible combinations exist 228, initial pitch mark combination(s) are again computed 225 and the generation of valid combination 220 from the initial combination is applied again. When no more pitch mark combinations exist 228, processing continues 229 as in FIG. 3A at 206.

Figure 4:
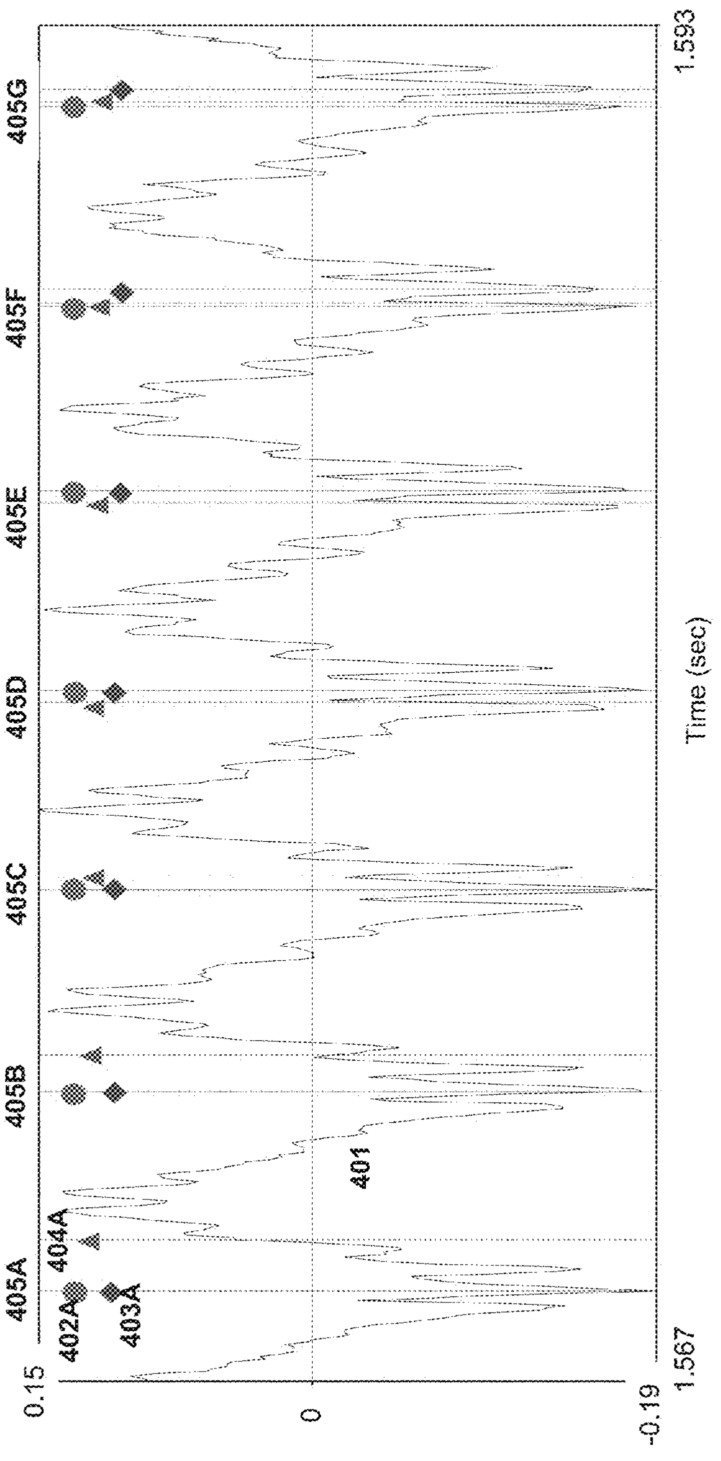
FIG. 4 is an annotated graph of a speech signal with pitch marks showing local pitch consistency, according to some embodiments of the invention.

Following are described some example applications of some embodiments of the invention. For example, various algorithms that determine pitch marks out of a discrete set of prominent candidates per pitch epoch occasionally compromise the local pitch mark consistency. Reference is now made to FIG. 4, which is an annotated graph of a speech signal with pitch marks showing local pitch consistency, according to some embodiments of the invention. The speech signal 401 shows seven pitch epochs at 405A, 405B, 405C, 405D, 405E, 405F, and 405G. The circles 402A represent the peak-picking pitch marks, the triangles 404A represent the GCI-based reference mark sequences, and the diamonds 403A represent the replaced pitch mark according to embodiments of the invention. The circles show local inconsistency and pitch drift in pitch epochs 405F and 405G. The triangles sow local inconsistencies and pitch drift at least in pitch epochs 405A and 405B.

Figure 5:
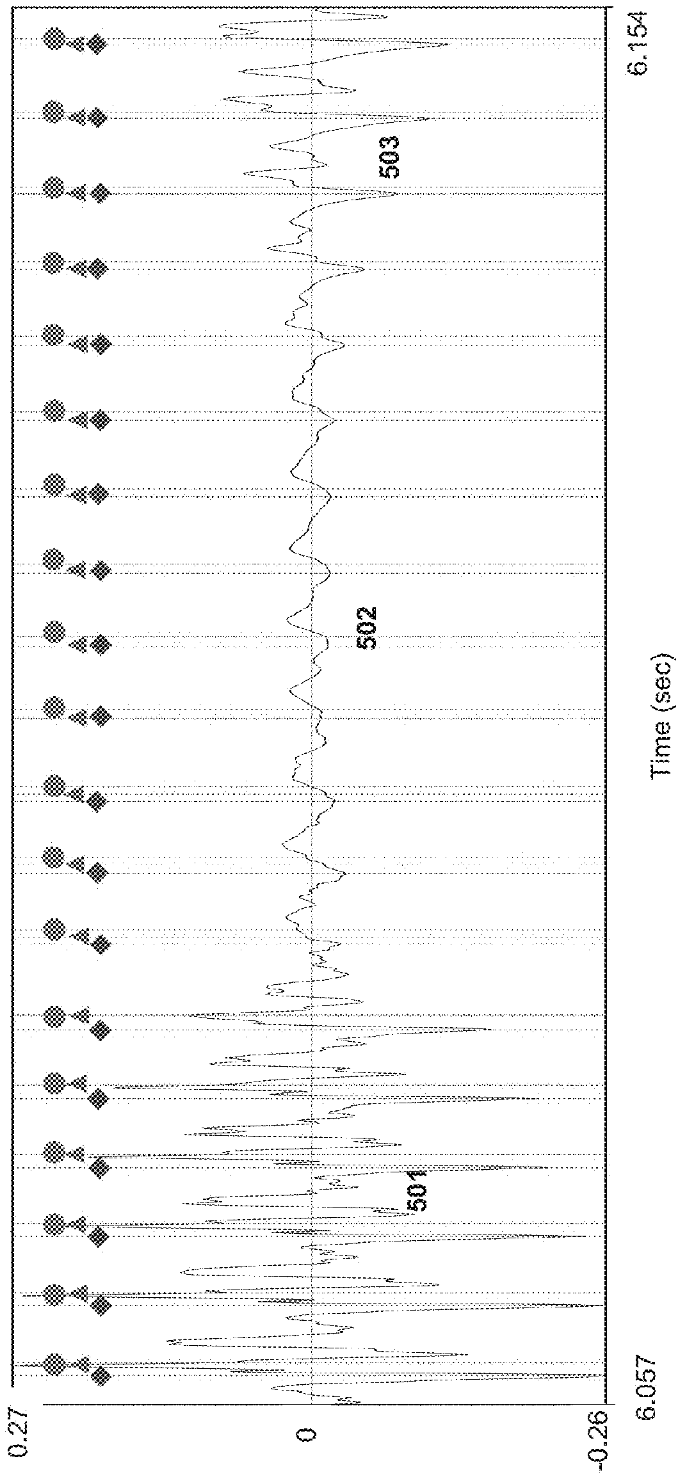
FIG. 5 is an annotated graph of a speech signal with pitch marks showing global pitch consistency, according to some embodiments of the invention.

Reference is now made to FIG. 5, which is an annotated graph of a speech signal with pitch marks showing global pitch consistency, according to some embodiments of the invention. The speech signal comprises a first voiced section 501, an intermediate section 502, and a second voiced section 503. The pitch marks denoted by circles represent a cross-correlation-based pitch mark combination. The pitch drift away from prominent negative peaks is observed throughout the speech signal. The triangles represent the cross-correlation range limited pitch mark combination. The pitch drift away from negative peaks is corrected in about half of the pitch epochs. The diamonds represent a global consistency maximized preferred pitch mark combination. Pitch mark drift is not observed for the diamonds.

Figure 6:
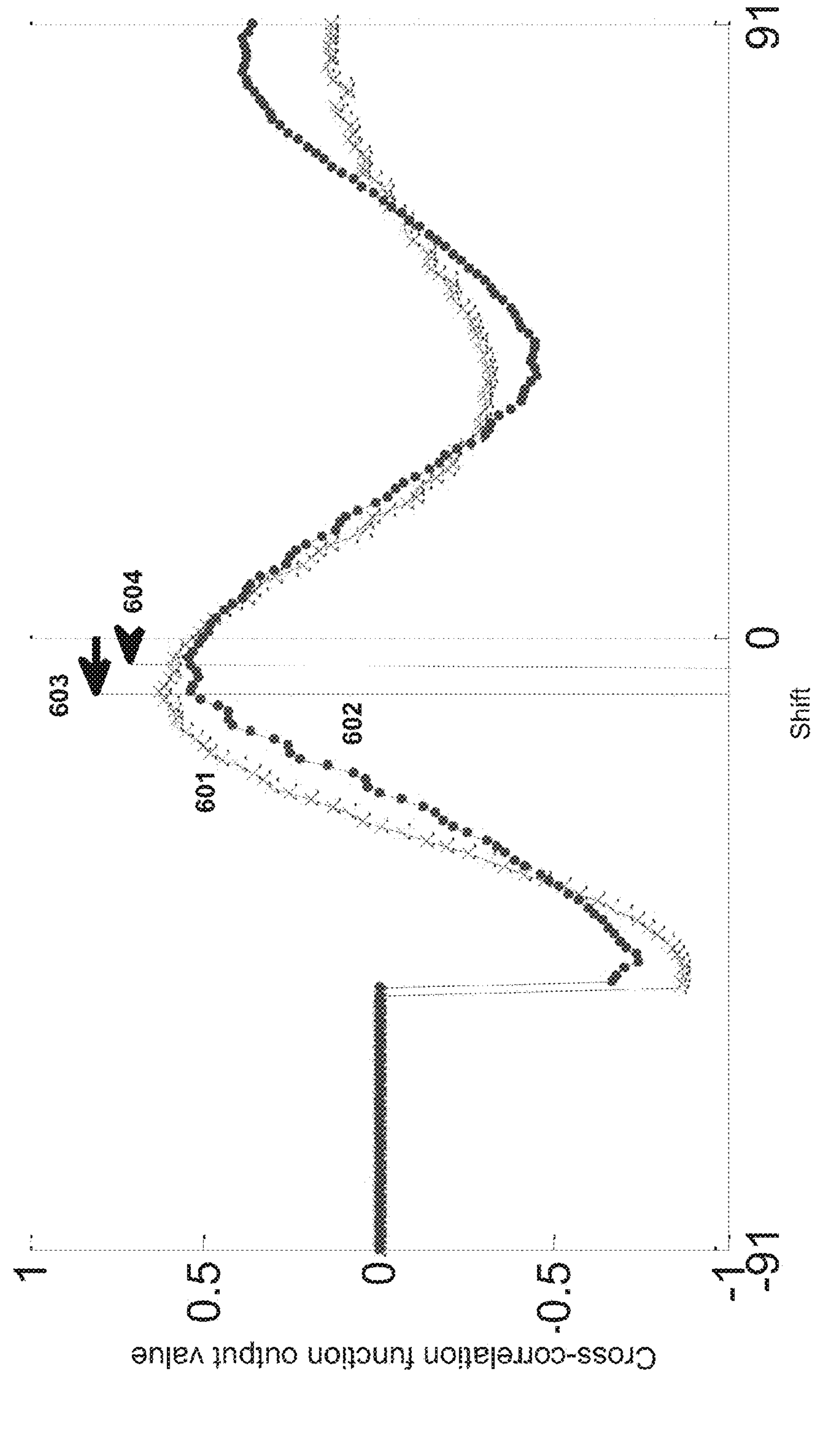
FIG. 6 is an annotated graph of an output value from a cross-correlation function applied to a speech signal, according to some embodiments of the invention.

Reference is now made to FIG. 6, which is an annotated graph of an output value from forward and backward cross-correlation functions for adjacent pitch epochs, according to some embodiments of the invention. Dots 602 mark the forward cross-correlation function output values, and x's mark the reverse cross-correlation function output values for different temporal offsets, denoted Δ. Note the left region of the graph, where the spurious peaks have been set to zero. The optimal shift to in the forward direction 604 is different from the optimal shift in the reverse temporal direction 602.

Figure 7:
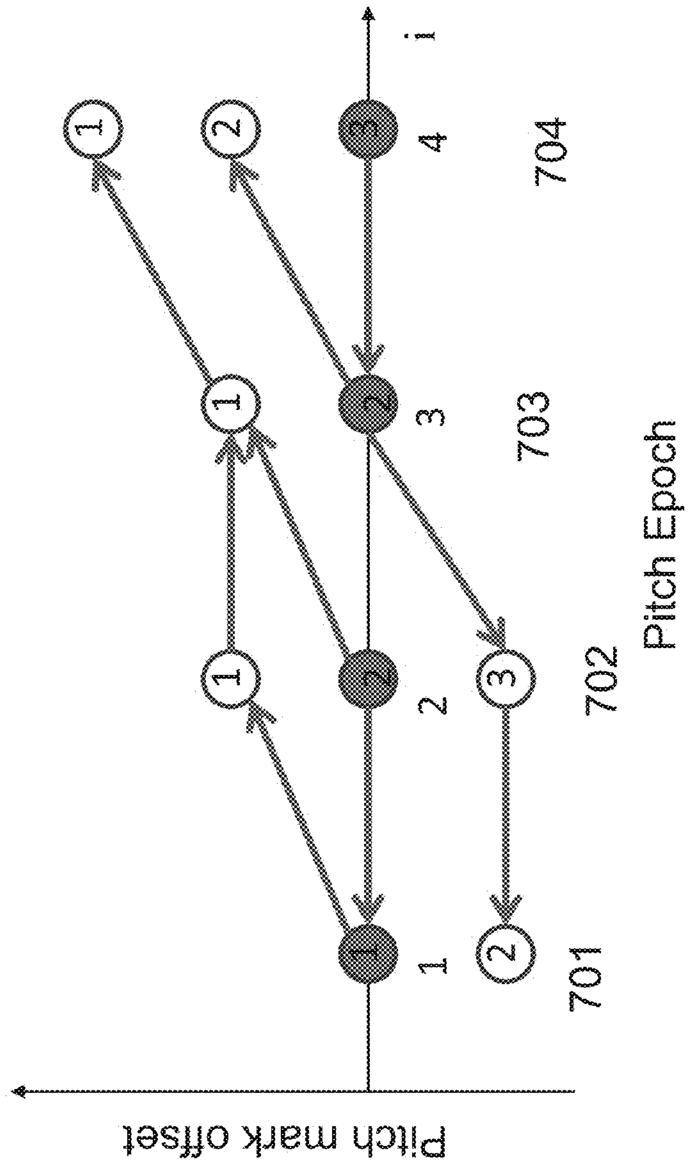
FIG. 7 is an example graph of locally consistent pitch mark combinations, according to some embodiments of the invention.

Reference is now made to FIG. 7, which is an example graph of locally consistent pitch mark combinations, according to some embodiments of the invention. The graph shows four pitch epochs (701, 702, 703, and 704), and each of the pitch marks may be associated with the fixed pitch epoch, for example, serving as a starting point for a pitch mark combination, as shown by the arrows. Since the forward and reverse cross-correlation function output value is different for the forward and reverse directions, the pitch mark limits and resulting selected combinations may be different depending on the starting point. Similarly, the global consistency criterion may be different for the different combinations depending on the starting point.

In another example, a large US English single female speaker voice corpus of about 9000 sentences was used in a set of subjective experiments. The voices were recorded using a microphone in a neutral style, but containing various peculiarities, such as frequent glottal bursts, creak breathiness, and the like. An embodiment of the invention was applied to baseline pitch marks, each obtained by a single pass peak-picking algorithm, and pitch values detected by a frequency-domain pitch detector with a constant pitch detection rate of 200 Hz. In a first experiment, two TTS voice models were determined from the whole voice corpus. Both TTS voice models are identical, besides the pitch mark sets they contain. RefMrkTTS system contains the baseline pitch marks that served as an input to methods of the present invention, while CorrMrkTTS contains the output.

Three pair sets were prepared for the evaluation. In OrigPit, TTS stimuli were generated by TD-PSOLA with the original pitch that underwent a moderate Gaussian smoothing. In HighPit, the samples are generated by TD-PSOLA with a smoothed pitch increased by 6.5%. In LowPit, the samples are generated by TD-PSOLA with a smoothed pitch lowered by 6.5%. Seven second-long (7.5 seconds average length) stimuli were generated for each set, comprising 21 stimuli pairs for the pitch mark evaluation within the TTS stimuli. Thirteen voters, where seven of them are TTS experts, participated in an ABX auditory preference test. The preferred pitch mark combination was 3 times more frequently preferred over the baseline, with statistical significance of $p<0.001$. However, for the long stimuli, TTS concatenation errors often produced local roughness corrections, thus resulting in about 45% votes that did not detect a difference.

Additional ABX evaluation was performed on original speech recordings of the same voice that underwent a prosody modification. This time, a GCI detection system was used for the input pitch mark generation. The reference system performs GCI detection, applies an extensive dynamic programming search, and is designed to cope with various voice modalities. This system performed better than other GGI detection algorithms in terms of a fit to a gold standard laryngograph output signal.

For the second subjective ABX evaluation, 10 long sentences were randomly selected out of the voice corpus. The reference marks were generated using the covarep Software package, while the new pitch marks according to embodiments of the invention were generated as in the first test. The output stimuli pairs with modified pitch were produced by TD-PSOLA implementation of the Praat software package, with input from the pitch mark sets.

To determine an output prosody for the experiment, pitch trajectory was estimated by the Praat software package pitch detector with 200 Hz update rate, followed by a default pitch trajectory stylization. Half of the sentences had their pitch curve raised by 20%, and another half had their pitch lowered by 20%. Thirteen voters, 7 of them TTS experts, participated in the second ABX preference test, judging 10 stimuli pairs in a random order. The experimental results show that for the recorded speech modification new marks were about 4.5 times more frequently preferred over the selected baseline marks, with a statistical significance of $p<0.000001$. Approximately 34% of voters did not detect a difference.

The methods as described above may be used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant speech processing methods will be developed and the scope of the term speech processing is intended to include all such new technologies a priori.

It is expected that during the life of a patent maturing from this application many relevant pitch mark detecting methods will be developed and the scope of the term pitch mark detection is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for receiving and processing continuous speech signals for generating therefrom one or more pitch mark combinations for speech processing, comprising:

receiving a continuous speech signal representing audible speech recorded by a microphone, wherein a sequence of pitch values and a plurality of pitch mark temporal values are computed from said continuous speech signal, each of said plurality of pitch mark temporal values associated with one element of said sequence;

using at least one hardware processor for executing a code for processing said continuous speech signal and generating at least one pitch mark combination, said processing comprises:

computing for each of said plurality of pitch mark temporal values a lower limit temporal value and an upper limit temporal value by a cross-correlation function of said continuous speech signal around said pitch mark temporal values associated with pairs of elements in said sequence;

computing at least one new temporal value between said lower limit temporal value and said upper limit temporal value;

automatically generating said at least one pitch mark combination by replacing at least one of said plurality of pitch mark temporal values with said at least one new temporal value;

outputting said at least one pitch mark combination of said plurality of pitch mark temporal values to a speech processor for at least one of speech processing, modification, and conversion to an audible output sound signal;

wherein elements of said at least one combination are between said lower limit temporal value and said upper limit temporal value.

2. The method of claim 1, wherein said cross-correlation is a normalized linear cross-correlation function.

3. The method of claim 1, wherein said continuous speech signal is preprocessed by a zero-phase, low-pass filter to reduce its high-band noise components prior to said computing of said cross-correlation function.

4. The method of claim 1, wherein said cross-correlation function is computed using a formula $$r(\Delta) = \frac{x(\Delta)^T y(0)}{0.5(\|x(\Delta)\|^2 + \|y(0)\|^2)},$$

where Δ denotes a temporal offset value from one of said plurality of pitch mark temporal values, x(Δ) denotes an input section of said continuous speech signal shifted by Δ samples relative to a first pitch mark temporal value and y(0) denotes an unshifted input section of said continuous speech signal associated with a second pitch mark temporal value.

5. The method of claim 1, wherein said lower limit temporal value and said upper limit temporal value are determined by a plurality of input values of said cross-correlation function, associated with respective output values of said cross-correlation function that are a predefined ratio of a peak output value of said cross-correlation function.

6. The method of claim 5, wherein said predefined ratio is 0.97 of said peak output value.

7. The method of claim 5, wherein said predefined ratio is a value between 0.8 and 0.999 of said peak output value.

8. The method of claim 4, wherein said first input section of said continuous speech signal is temporally preceding said unshifted input section of said continuous speech signal.

9. The method of claim 4, wherein said unshifted input section of said continuous speech signal is temporally preceding said input section of said continuous speech signal.

10. The method of claim 1, further comprising selecting a preferred pitch mark sequence from said at least one pitch mark combination, wherein said preferred pitch mark sequence is selected by minimization of a sequence global consistency criterion, wherein said sequence global consistency criterion is a sum of individual global consistency criteria of each said element in said at least one pitch mark combination.

11. The method of claim 10, wherein each said individual global consistency criteria is derived from a temporal drift of each said element, relative to a certain reference pitch mark.

12. The method of claim 11, wherein said continuous speech signal is preprocessed by a zero-phase, low-pass filter to reduce its high-band noise components prior to said computing of said pitch mark drift function.

13. The method of claim 1, wherein said continuous speech signal is digitized by said at least one hardware processor.

14. The method of claim 1, wherein said sequence of pitch values are computed from said continuous speech signal by said at least one hardware processor.

15. The method of claim 1, wherein said plurality of pitch mark temporal values are computed from said continuous speech signal by said at least one hardware processor.

16. The method of claim 1, wherein said a sequence of pitch values are non-zero pitch mark values.

17. A computer program product for receiving and processing continuous speech signals for generating therefrom one or more pitch mark combinations for speech processing, said computer program product comprising a non-transitory computer readable storage medium having program instructions embodied therewith, the program instructions executable by a hardware processor to cause said hardware processor to:

perform a signal processing of a continuous speech signal representing audible speech recorded by a microphone for generating at least one pitch mark combination, wherein a sequence of pitch values and a plurality of pitch mark temporal values are computed from said continuous speech signal, each of said plurality of pitch mark temporal values associated with one element of said sequence;

wherein said signal processing is performed by:

computing, for each of said plurality of pitch mark temporal values, a lower limit temporal value and an upper limit temporal value by a cross-correlation function of said continuous speech signal around said pitch mark temporal values associated with pairs of elements in said sequence;

computing at least one new temporal value between said lower limit temporal value and said upper limit temporal value; and automatically generating said at least one pitch mark combination b replacing at least one of said plurality of pitch mark temporal values with said at least one new temporal value;

output, by said hardware processor, at least one pitch mark combination of said plurality of pitch mark temporal values to a speech processor for at least one of speech processing, modification, and conversion to an audible output sound signal, wherein elements of said at least one pitch mark combination are between said lower limit temporal value and said upper limit temporal value to prevent pitch mark drift.

18. A system for receiving and processing continuous speech signals for generating therefrom one or more pitch mark combinations for speech processing, comprising:

an input interface, for receiving a continuous speech signal representing audible speech recorded by a microphone and a plurality of speech parameters from a speech processor; wherein a sequence of pitch values and a plurality of pitch mark temporal values are computed from said continuous speech signal, each of said plurality of pitch mark temporal values associated with one element of said sequence;

at least one hardware processor, adapted to executing a code for processing said continuous speech signal and generating at least one pitch mark combination, said processing comprises:

compute for each of said plurality of pitch mark temporal values a lower limit temporal value and an upper limit temporal value by a cross-correlation function of said continuous speech signal around said pitch mark temporal values associated with pairs of elements in said sequence, compute at least one new temporal value between said lower limit temporal value and said upper limit temporal value, and automatically generate said at least one pitch mark combination by replacing at least one of said plurality of pitch mark temporal values with said at least one new temporal value, wherein elements of said at least one pitch mark combination are between said lower limit temporal value and said upper limit temporal value to prevent pitch mark drift; and an output interface, for sending said at least one pitch mark combination to a speech processor for at least one of a speech processing, a modification, and a conversion to an audible output sound signal.

19. The system of claim 18, wherein said speech processor is incorporated into said at least one hardware processor.

20. The system of claim 18, wherein said input interface and said output interface are at least one of a network interface and a user interface.

* * * * *